US009103557B2

(12) United States Patent
Choi et al.

(10) Patent No.: US 9,103,557 B2
(45) Date of Patent: Aug. 11, 2015

(54) AIR CONDITIONER AND METHOD FOR CONTROLLING THE SAME BASED ON A CALCULATED VALUE OF A MALFUNCTIONING SENSOR

(75) Inventors: Changmin Choi, Seoul (KR); Baikyoung Chung, Seoul (KR); Sunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 364 days.

(21) Appl. No.: 12/975,994

(22) Filed: Dec. 22, 2010

(65) Prior Publication Data

US 2011/0154834 A1    Jun. 30, 2011

(30) Foreign Application Priority Data

Dec. 24, 2009    (KR) .................. 10-2009-0130977

(51) Int. Cl.
| | | |
|---|---|---|
| F25B 7/00 | (2006.01) | |
| F24F 11/00 | (2006.01) | |
| F25B 41/06 | (2006.01) | |
| F25B 49/00 | (2006.01) | |
| G05D 23/19 | (2006.01) | |
| F25B 13/00 | (2006.01) | |

(52) U.S. Cl.
CPC ........... *F24F 11/0009* (2013.01); *F25B 41/062* (2013.01); *F25B 49/005* (2013.01); *G05D 23/1932* (2013.01); *F24F 11/0012* (2013.01); *F24F 2011/0045* (2013.01); *F24F 2011/0052* (2013.01); *F25B 13/00* (2013.01); *F25B 2313/0233* (2013.01); *F25B 2313/02741* (2013.01); *F25B 2313/0314* (2013.01); *F25B 2500/06* (2013.01); *F25B 2600/2513* (2013.01); *Y02B 30/765* (2013.01)

(58) Field of Classification Search
CPC .............. F24F 11/0009; F24F 11/0012; F24F 2011/0045; F24F 2011/0052; F25B 13/00; F25B 2313/0233; F25B 2313/02741; F25B 2313/0314; F25B 2500/06; F25B 2600/2513; G05D 23/1932; Y02B 30/765
USPC ........... 62/126, 161, 162, 125, 166, 203, 214, 62/246, 176.6, 157, 127, 199, 200, 222, 62/515, 524
See application file for complete search history.

(56) References Cited

U.S. PATENT DOCUMENTS

| | | | | |
|---|---|---|---|---|
| 4,432,210 A | * | 2/1984 | Saito | ................................ 62/126 |
| 4,535,598 A | * | 8/1985 | Mount | ............................ 62/126 |

(Continued)

FOREIGN PATENT DOCUMENTS

| | | |
|---|---|---|
| CN | 101504179 A | 8/2009 |
| EP | 1 241 417 A1 | 9/2002 |
| GB | 2 100 474 A | 12/1982 |

OTHER PUBLICATIONS

European Search Report dated Nov. 12, 2014 issued in Application No. 10 196 541.6.

*Primary Examiner* — Cheryl J Tyler
*Assistant Examiner* — Ana Vazquez
(74) *Attorney, Agent, or Firm* — Ked & Associates LLP

(57) ABSTRACT

Air conditioner and a method for controlling the air conditioner based on a calculated value of a malfunctioning sensor are provided. The method for controlling the air conditioner having a plurality of indoor devices includes detecting a malfunctioning sensor of any one of the plurality of indoor devices, calculating a value of the malfunctioning sensor based on a value of a normal functioning sensor of another indoor device of the plurality of indoor devices, and controlling the indoor device based on the calculated value of the non-functioning sensor.

11 Claims, 3 Drawing Sheets

(56) References Cited

U.S. PATENT DOCUMENTS

| | | | |
|---|---|---|---|
| 4,660,386 A * | 4/1987 | Hansen et al. | 62/126 |
| 5,115,643 A * | 5/1992 | Hayata et al. | 62/115 |
| 7,188,482 B2 * | 3/2007 | Sadegh et al. | 62/126 |
| 7,730,730 B2 * | 6/2010 | Ha et al. | 62/175 |
| 2004/0016251 A1 | 1/2004 | Street et al. | 62/209 |
| 2006/0042277 A1 | 3/2006 | Sadegh et al. | 62/129 |
| 2009/0094998 A1 | 4/2009 | McSweeney et al. | 62/129 |

\* cited by examiner

AIR CONDITIONER AND METHOD FOR CONTROLLING THE SAME BASED ON A CALCULATED VALUE OF A MALFUNCTIONING SENSOR

This application claims priority from Korean Patent Application No. 10-2009-0130977 filed on Dec. 24, 2009 in the Korean Intellectual Property Office, the disclosure of which is incorporated herein by reference in its entirety.

BACKGROUND OF THE INVENTION

1. Field of the Invention

The present invention relates to an air conditioner and method for controlling the same, more particularly, to an air conditioner and method for controlling the same which may continue an operation when a sensor breaks down.

2. Description of the Conventional Art

An air conditioner is an apparatus for controlling a condition of air so as to keep a condition of air in the room to pleasant condition. The air conditioner absorbs a heat in a certain space or discharge a heat to the space so that it manages the temperature and humidity of the space to keep an optimum level. The air conditioner essentially needs an indoor unit which absorbs a heat from a certain space or discharge a heat to the space.

The indoor unit includes various sensors. It requires a way to cope with break down of the sensors.

SUMMARY OF THE INVENTION

An object of the present invention is to provide an air conditioner and method for controlling the same, which can continue an operation when a sensor breaks down.

Another object of the present invention is to provide an air conditioner and method for controlling the same, which can calculate a value of the broken sensor without an extra hardware.

The objects of the present invention are not restricted by the above-mentioned objects. The other objects of the present will be understood by those of ordinary skill in the art that various changes in form and details may be made therein without departing from the spirit and scope of the present invention as defined by the following claims.

To achieve these objects and other advantages and in accordance with the purpose of the invention, there is provided a method for controlling an air conditioner, wherein the air conditioner comprising a plurality of indoor units, the method comprising; occurring a breakdown in a sensor of any one of the plurality of indoor units, calculating a value of the sensor, and controlling the indoor unit according to the calculated value of the sensor.

To achieve these objects and other advantages and in accordance with the purpose of the invention, there is provided an air conditioner comprising an outdoor unit which compresses a refrigerant and performs a heat exchange with outdoor air; and a plurality of indoor units which connects to the outdoor unit and performs a heat exchange with indoor air, wherein any one of the plurality of indoor units is controlled by calculating a value of the sensor when the sensor breaks down.

The rest of the embodiments will be described in detail and the attached drawings.

DETAILED DESCRIPTION OF THE PREFERRED EMBODIMENT

While the present invention has been particularly shown and described with reference to exemplary embodiments thereof, it will be understood by those of ordinary skill in the art that various changes in form and details may be made therein without departing from the spirit and scope of the present invention as defined by the following claims. A same number in figures indicates the same element.

The present invention will hereinafter be described in detail with reference to the accompanying drawings in which exemplary embodiments of the invention are shown.

Figure 1:
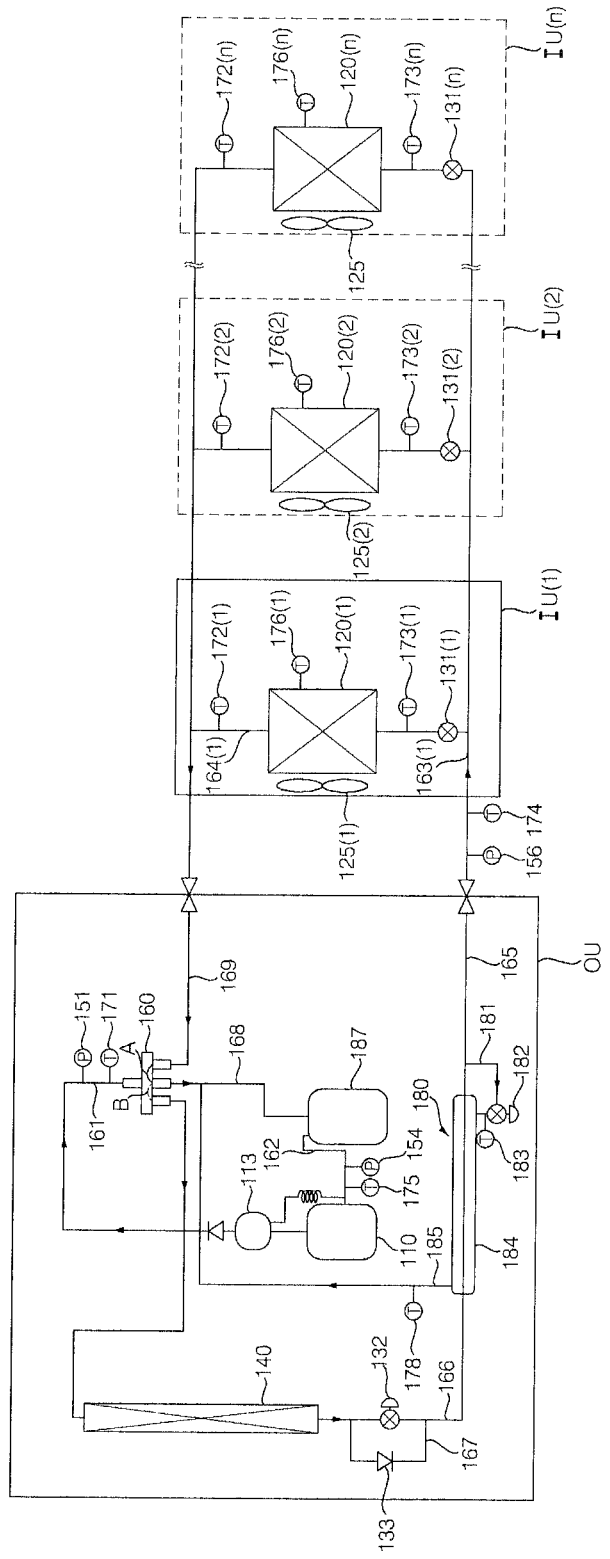
FIG. 1 is a schematic diagram of an air conditioner according to the exemplary embodiment of the present invention.

FIG. 1 is a schematic diagram of an air conditioner according to the exemplary embodiment of the present invention.

An air conditioner according to the exemplary embodiment of the present invention comprises an outdoor unit OU and a plurality of indoor units IU.

The outdoor unit OU may comprise a compressor 110, an outdoor heat exchanger 140, an outdoor expansion valve 132, and a subcooler 180. The air conditioner may comprise one or a plurality of outdoor units OU. The air conditioner comprises an outdoor unit OU in the exemplary embodiment.

The compressor 110 compresses low temperature/low pressure refrigerant into high temperature/high pressure refrigerant. The compressor 110 may be variously structured. For example, inverter type compressors or constant speed compressors may be used as the compressor. A discharge temperature sensor 171 and a discharge pressure sensor 151 are disposed at a discharge pipe 161 of the compressor 110. In addition, an intake temperature sensor 175 and an intake pressure sensor 154 are disposed at an intake pipe 162 of the compressor 110.

The outdoor unit OU comprises a compressor 110. However, the present invention is not limited to this. The outdoor unit OU can comprise a plurality of compressors. In addition, the outdoor unit OU can comprise an inverter type compressor together with a constant speed compressor.

An accumulator 187 may be disposed at the intake pipe 162 of the compressor 110 to prevent the liquid-phase refrigerant from flowing into the compressor 110. An oil separator 113 may be disposed at the discharge pipe 161 to collect oil contained in the refrigerant discharged.

A four-way valve 160 is a switch valve which changes a flow path according to the heating and cooling mode. A four-way valve 160 guides the refrigerant compressed in the compressor 110 to the outdoor heat exchanger 140 in the cooling mode and to the indoor heat exchanger 120 in the heating mode. The four-way valve 160 is converted into a state A in the cooling mode and into a state B in the heating mode.

The outdoor heat exchanger 140 is disposed at an outdoor space. The refrigerant passing through the outdoor heat exchanger 140 exchanges the heat with the outdoor air. The outdoor heat exchanger 140 functions as a condenser in the cooling mode and as an evaporator in the heating mode.

The outdoor expansion valve 132 throttles the refrigerant in the heating mode and is disposed at the intake pipe 166 which connects a liquid pipe 165 and the outdoor heat exchanger 140. A first bypass pipe 167 is disposed at the intake pipe 166 so that the refrigerant can bypass the outdoor expansion valve 132. A check valve 133 is disposed at the first bypass pipe 167.

A check valve 133 is opened in the cooling mode so that the refrigerant can flow from the outdoor heat exchanger 140 to the plurality of the indoor unit IU. The check valve 133 shuts off the refrigerant in the heating mode.

The super cooler 180 includes a super cooling heat exchanger 184, a second bypass pipe 181, a super cooling expansion valve 182, and a discharge pipe 185. The super cooling heat exchanger 184 is disposed at the intake pipe 166. In the cooling mode, the second bypass pipe 181 directs the refrigerant discharged from the super cooling heat exchanger 184 to the super cooling expansion valve 182.

The super cooling expansion valve 182 is disposed at the second bypass pipe 181 and throttles the refrigerant flowing into the second bypass pipe 181 and reduces the temperature and pressure of the refrigerant and then directs the refrigerant into the super cooling heat exchanger 184.

There is a variety of types of super cooling expansion valves 182. A linear expansion valve may be used as the super cooling expansion valve considering convenience in use and control. A super cooling temperature sensor 183 is disposed at the second bypass pipe 181 and senses the temperature of the refrigerant throttled in the super cooling expansion valve 182.

In the cooling mode, the condensed refrigerant passed through the outdoor heat exchanger 140 exchanges the heat with the low temperature refrigerant passing through the second bypass pipe 181 in the super cooling heat exchanger 184, and then the super-cooled refrigerant flows into the plurality of indoor units IU.

The refrigerant passing through the second bypass pipe 181 heat-exchanges in the super cooling heat exchanger 184 and flows into an accumulator 187 by the discharge pipe 185. A discharge pipe temperature sensor 178 is disposed at the discharge pipe 185 to sense the temperature of the refrigerant flowing into the accumulator 187.

A liquid pipe temperature sensor 174 and a liquid pipe pressure sensor 156 are disposed at the liquid pipe 165 which connects the super cooling heat exchanger 180 and the plurality of the indoor units IU.

In the air conditioner according to the exemplary embodiment of the present invention, each of the indoor units IU may comprise an indoor heat exchanger 120, an indoor blowing fan 125 and an indoor expansion valve 131. The air conditioner may have one or more indoor units IU and has a plurality of indoor units from IU (1) to IU (n).

The indoor heat exchanger 120 is generally disposed at the indoor space. The refrigerant passing through the indoor heat exchanger 120 heat-exchanges with the indoor air. The indoor heat exchanger 120 functions as an evaporator in the cooling mode and as a condenser in the heating mode. An indoor temperature sensor 176 is disposed in the indoor heat exchanger 120 to sense the temperature of the indoor.

The indoor blowing fan 125 blows the indoor air heat-exchanged in the indoor heat exchanger 120.

The indoor expansion valve 131 is a device for throttling the refrigerant which is supplied in the cooling mode. The indoor expansion valve 131 is disposed at an indoor inlet pipe 163 of the indoor unit IU. There is a variety of types of indoor expansion valves, a linear expansion valve may be used as the indoor expansion valve 131 considering convenience in use and control.

The indoor expansion valve 131 may open at the preset opening degree set in the cooling mode, may fully open in the heating mode. The indoor expansion valve 131 can be closed in the blowing mode. The indoor expansion valve 131 is not closed physically but opened at the opening degree that the refrigerant is not flowed. The indoor expansion valve 131 may open or close for checking the breakdown.

An indoor inlet pipe temperature sensor 173 is disposed at the indoor inlet pipe 163. The indoor inlet pipe temperature sensor 173 may be disposed at the position between the indoor heat exchanger 120 and the indoor expansion valve 131. In addition, an indoor outlet pipe temperature sensor 172 is disposed at the indoor outlet pipe 164.

An indoor temperature sensor 179 is disposed at the indoor unit IU to sense the temperature of the indoor air. The indoor temperature sensor 179 senses the temperature of the indoor at which the indoor unit IU is disposed.

The following will describe the flow of the refrigerant in the cooling mode of the above-described air conditioner.

The high temperature/high pressure gas-phase refrigerant discharged from the compressors 110 is directed into the outdoor heat exchanger 140 via the four-way valve 160. The refrigerant is condensed in the outdoor heat exchanger 140 by heat-exchanging with the outdoor air. The refrigerant discharged from the outdoor heat exchanger 140 is directed into a super cooler 180 by the outdoor expansion valve 132 fully opened and the bypass pipe 133. The refrigerant flowing into the super cooler 180 is supercooled in the super-cooling heat exchanger 184 and then directed into the plurality of indoor units IU.

A portion of the refrigerant supercooled in the super-cooling heat exchanger 184 is throttled in the supercooling expansion valve 182 so that the throttled refrigerant supercools the refrigerant passing through the super cooling heat exchanger 184. The refrigerant supercooled in the super cooling heat exchanger 184 is directed to the accumulator 187.

The refrigerant directed into each of the indoor units IU is throttled by the indoor expansion valve 131 which is opened by a predetermined degree of opening and is vaporized in the indoor heat exchanger 120 by heat-exchanging with the indoor air. The vaporized refrigerant is directed into the compressor 110 passing through the four-way valve 160 and the accumulator 187.

The following will describe the flow of the refrigerant in the heating mode of the above-described air conditioner.

The high temperature/high pressure gas-phase refrigerant discharged from the compressor 110 is directed into the plurality of indoor units IU through the four-way valve 160. The indoor expansion valve 131 of respective indoor unit IU is fully opened. The refrigerant directed from the indoor unit IU is throttled by the outdoor expansion valve 132 and then is vaporized by heat-exchanging with the outdoor air passing through the outdoor heat exchanger 140. The vaporized refrigerant is directed into the intake pipe 162 of the compressor 110 via the four-way valve 160 and the accumulator 187.

Figure 2:
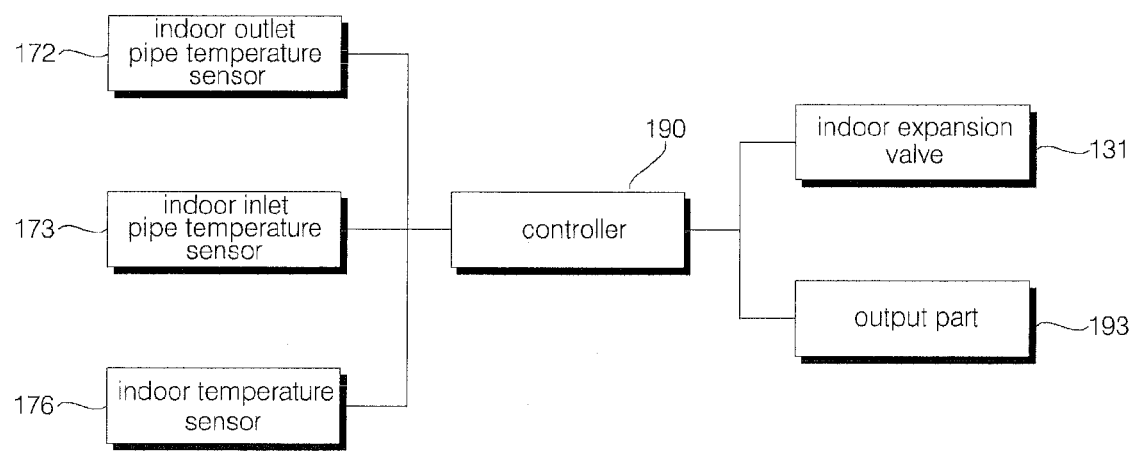
FIG. 2 is a block diagram of an air conditioner according to the exemplary embodiment of the present invention.

FIG. 2 is a block diagram of an air conditioner according to the exemplary embodiment of the present invention.

An indoor outlet pipe temperature sensor 172 senses the temperature of the refrigerant discharging from the indoor heat exchanger 120. The indoor outlet pipe temperature sensor 172 is disposed at the indoor outlet pipe 164.

An indoor inlet pipe temperature sensor 173 senses the temperature of the refrigerant flowing into the indoor heat exchanger 120. The indoor inlet pipe temperature sensor 173 is disposed at the indoor inlet pipe 163 which connects the indoor heat exchanger 120 with the indoor expansion valve 131.

An indoor temperature sensor 176 senses the temperature of the indoor air. The indoor temperature sensor 176 is disposed at the indoor unit IU.

When a controller 190 judges the breakdown of the sensor, an output part 193 may show the information about breakdown by sounds or visually. Also, the output part 193 may transmit the information to the other system.

The indoor expansion valve 131 is a device for throttling the refrigerant in the cooling mode. The degree of opening of the indoor expansion valve 131 is transmitted to the controller 190.

The controller 190 controls the overall operation of the air conditioner. The controller 190 may calculate the value of the broken sensor by the operating condition and the value of the sensor of the normal indoor unit except the indoor unit having the broken sensor. It will be described in more detail later.

Figure 3:
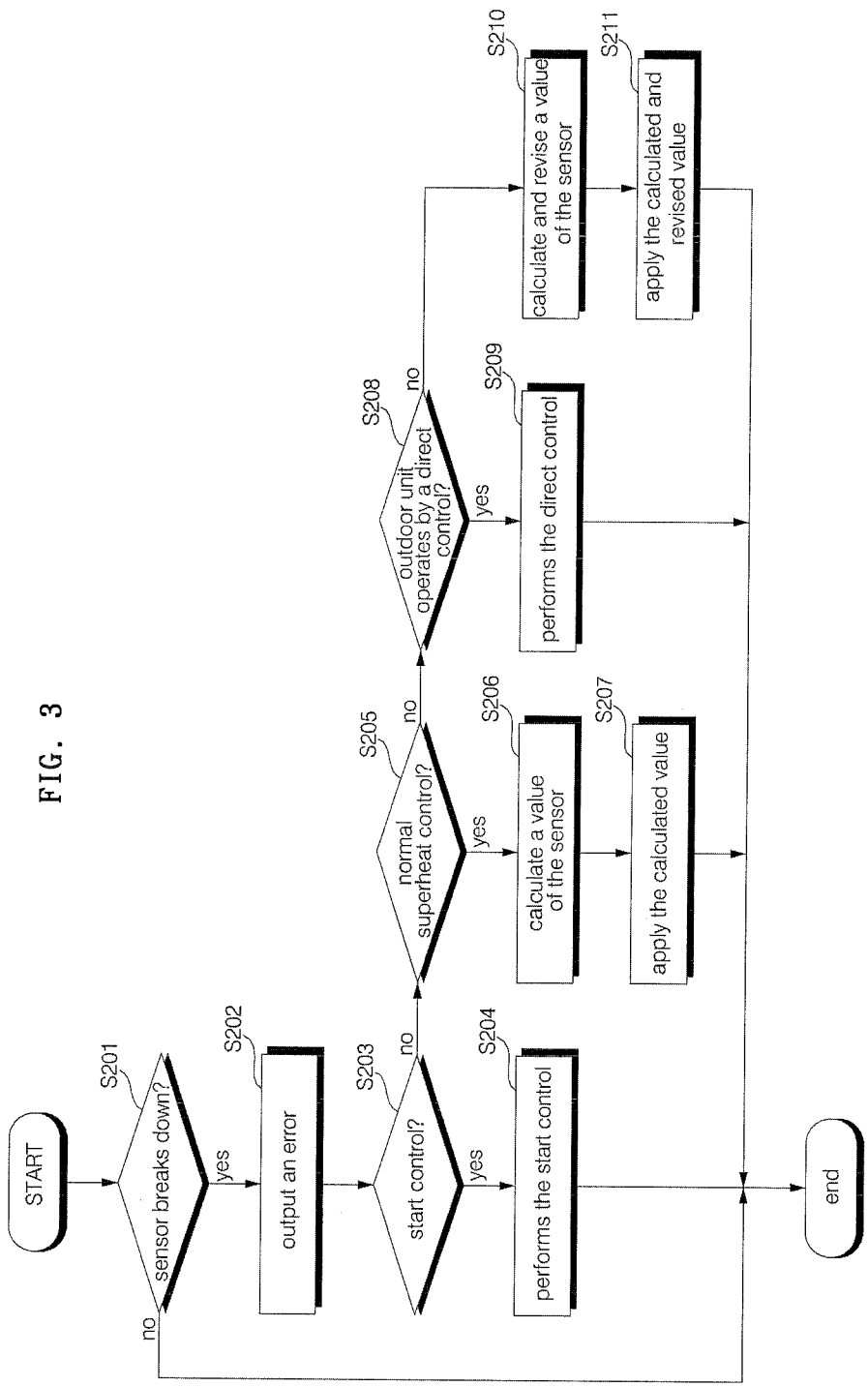
FIG. 3 is a flow chart showing a method for controlling an air conditioner according to the exemplary embodiment of the present invention.

FIG. 3 is a flow chart showing a method for controlling an air conditioner according to the exemplary embodiment of the present invention.

The controller judges whether the sensor is broken or not. (S201) It is desirable that the sensor of the indoor unit IU has not a serious effect on the operation of the system even if the sensor is broken. If an outdoor unit sensor breaks down, the controller 190 has to stop the operation. The sensor comprises the indoor outlet pipe temperature sensor 172 and/or the indoor inlet pipe temperature sensor 173.

The controller 190 judges the break down of the sensor if the value of the sensor is not changed or if the value of the sensor reaches a peak frequently. If the value of the sensor is not changed during the preset time, the controller 190 judges that the sensor breaks down. If the value of the sensor reaches a peak more times than the preset number during the preset time, the controller 190 judges that the sensor breaks down. Hereinafter, it assumes that the indoor outlet pipe temperature sensor 172(1) and/or the indoor inlet pipe temperature sensor 173(2) of the first indoor unit IU (1) breaks down.

If the sensor breaks down, the controller 190 outputs an error by the output part 193. If the controller judges the breakdown of the sensor, the output part 193 shows the breakdown to the outside by sounds or visually or transmits it to the other system.

The controller 190 judges whether the present air conditioner operates by a start control or not. (S203) The start control performs when the indoor unit of the air conditioner is started at first time. Because the value of the sensor at the beginning is different from the usual, the controller 190 judges the start control. If the present air conditioner operates by the start control, the controller 190 performs the start control continuously.

If the air conditioner don't operated by the start control, the controller 190 judges whether the present air conditioner operates a normal superheat control or not. (S205) The normal superheat control performs in the general heating mode or cooling mode. If it is not the normal superheat control, it is an emergency control such as oil return or defrosting.

In case of the normal superheat control, the controller 190 calculates a value of the sensor broken. (S206) The controller 190 calculates the value of the broken sensor considering an operation condition and the value of the sensor of the other indoor unit (IU(n)) which is not an indoor unit (IU(1)) having the broken sensor.

According to a diagram of pressure-temperature of the refrigerant, it is general to have specific temperature on specific pressure. Because the pressure of the refrigerant in the indoor unit IU is decided by the degree of opening of the indoor expansion valve 132, the value of the indoor outlet pipe temperature sensor 172(1) and/or the indoor inlet pipe temperature sensor 173(1) can be calculated by the value of the indoor outlet pipe temperature sensor 172(n) and/or the indoor inlet pipe temperature sensor 173(n) and the degree of opening of the indoor expansion valve 131(n) of the other indoor unit IU(n) except the indoor unit IU(1) having the broken sensor.

For example, if the opening degree of the indoor expansion valve 131(1) of the broken indoor unit IU(1) is equal to the opening degree of the indoor expansion valve 131(n) of the other normal indoor unit IU(n), the value of the broken indoor outlet pipe temperature sensor 172(1) and/or the broken indoor inlet pipe temperature sensor 173(1) may be equal to the indoor outlet pipe temperature sensor 172(n) and/or the indoor inlet pipe temperature sensor 173(n). But, the controller 190 can revise the value when difference between the value of the indoor temperature sensor 176(1) and the value of the indoor temperature sensor 176(n) is great.

If there is not the opening degree of the indoor expansion valve 131(n) of the normal indoor unit IU(n) which is equal to the opening degree of the indoor expansion valve 131(1) of the broken indoor unit IU(1), the controller 190 can revise a little the value of the indoor outlet pipe temperature sensor 172(n) and/or the value of the indoor inlet pipe temperature sensor 173(n) of the indoor unit IU(n) that the opening degree is most similar to the broken indoor unit IU(1), and can calculate a value of the indoor outlet pipe temperature sensor 172(1) and/or a value of the indoor inlet pipe temperature sensor 173(1). But, the controller 190 can revise the value when difference between the indoor temperature sensor 176 (1) and the indoor temperature sensor 176(n) is great.

In addition, the controller 190 can calculate a value of the indoor outlet pipe temperature sensor 172(1) and/or the indoor inlet pipe temperature sensor 173(1) by an interpolation method from the indoor outlet pipe temperature sensor 172(n) and/or the indoor inlet pipe temperature sensor 173(n) of the plurality of indoor units IU(n) which is similar to the opening degree of the indoor expansion valve 131(1) of the broken indoor unit IU(1).

A calculation method of a value of the sensor is not limited to the above stated method. Namely, it is possible to calculate based on the measured pressure if the pressure of inside pipe of indoor unit IU is measured. In addition, it is possible to calculate the other value if it can find one value in the pressure-temperature diagram or the volume-temperature diagram of the refrigerant.

The controller 190 continues the normal superheat control considering to the calculated value of the sensor.

If it is not the emergency control but the normal superheat control, the controller 190 judges whether the outdoor unit OU operates by a direct control or not. (S208) The direct control operation of the outdoor unit is to control regardless of the value of the sensor such as an oil return. In case the direct control of the outdoor unit, the controller 190 performs the direct control. (S209)

If it is not the Direct Control of the Outdoor Unit, the Controller 190 calculates the value of the broken sensor and revises it. (S210) As stated in the step S206, the controller 190 calculates the value of the broken sensor by using the value of the sensor and an operation condition of the normal indoor unit IU(n) not the broken indoor unit IU(1). In case of the emergency control, the controller 190 revises the value of the sensor in the normal superheat control by the specific value and operates based on the revised value, so that the calculated value of the sensor is also revised by the same value.

The controller 190 continues the emergency control considering to the revised and calculated value of the sensor. (S211)

While the present invention has been particularly shown and described with reference to exemplary embodiments thereof, it will be understood by those of ordinary skill in the art that various changes in form and details may be made therein without departing from the spirit and scope of the present invention as defined by the following claims.

An air conditioner and the method for controlling the same according to an exemplary embodiment of the present invention have one or more effects as follows.

First, although a sensor breaks down, it is possible to continue an operation without the reduction of efficiency and performance of the air conditioner.

Second, it is possible to calculate the value of the broken sensor without the need for an extra hardware so that a stable operation of the air conditioner can be continued.

Third, it has an advantage that the value of the broken sensor can be estimated by using a value of the peripheral sensor disposed around the broken sensor.

The effects of the present invention are not restricted by the above-mentioned effects. The other effects of the present will be understood by those of ordinary skill in the art that various changes in form and details may be made therein without departing from the spirit and scope of the present invention as defined by the following claims.

What is claimed is:

1. A method for controlling an air conditioner, the air conditioner comprising an outdoor device, a plurality of indoor devices, each including a sensor and an indoor expansion valve, the method comprising: detecting a malfunctioning sensor of any one of the plurality of indoor devices; when the malfunctioning sensor of any one of the plurality of indoor devices is detected, determining whether the air conditioner is operating by a normal superheat control, wherein the normal superheat control performs in a general heating or cooling mode; when the air conditioner is operating by the normal superheat control, calculating a temperature value of the malfunctioning sensor based on a temperature value of a normal functioning sensor of another indoor device of the plurality of indoor devices and controlling the indoor device that includes the malfunctioning sensor based on the calculated temperature value of the malfunctioning sensor, wherein an opening degree of the indoor expansion valve of the another indoor device including the normal functioning sensor is equal to or greater than, or equal to or less than an opening degree of the indoor expansion valve of the indoor device including the malfunctioning sensor, and wherein the normal functioning sensor senses a temperature of refrigerant and the indoor expansion valve throttles the refrigerant;

determining whether the air conditioner operates by a direct control operation of the outdoor device when the air conditioner does not operate by the normal superheat control, wherein the direct control operation of the outdoor device is to control regardless of the value of the normal functioning sensor; and in case of the direct control operation of the outdoor device, controlling the indoor device regardless of the value of the normal functioning sensor.

2. The method for controlling the air conditioner of claim 1, further comprising:

outputting an error of the malfunctioning sensor when the malfunctioning sensor of any one of the plurality of indoor devices is detected.

3. The method for controlling the air conditioner of claim 1, wherein the calculating of the temperature value of the malfunctioning sensor is performed during an oil return emergency control or a defrosting emergency control, which are not the direct control operations of the outdoor device.

4. The method for controlling the air conditioner of claim 1, wherein the malfunctioning sensor is an inlet pipe temperature sensor of the indoor device or an outlet pipe temperature sensor of the indoor device.

5. The method for controlling the air conditioner of claim 1, wherein the calculating of the temperature value of the malfunctioning sensor is not performed until after the direct control operation has been determined to be not occurring.

6. The method for controlling the air conditioner of claim 1, wherein the calculating of the temperature value of the malfunctioning sensor is not performed until after a start control operation has been determined to have occurred, but before an occurrence of the direct control operation has been determined.

7. An air conditioner comprising: an outdoor device that compresses a refrigerant and performs a heat exchange with outdoor air; a plurality of indoor devices that connects to the outdoor device and performs a heat exchange with indoor air, wherein each of the plurality of indoor devices includes a sensor that senses a temperature of refrigerant and an indoor expansion valve that throttles the refrigerant; and a controller configured to detect a malfunctioning sensor of any one of the plurality of indoor devices, wherein, when the controller detects the malfunctioning sensor of any one of the plurality of indoor devices, the controller determines whether the air conditioner is operating by a normal superheat control, wherein the normal superheat control performs in a general heating or cooling mode, when the air conditioner is operating by the normal superheat control, the controller calculates a temperature value of the malfunctioning sensor based on a temperature value of a normally functioning sensor of another indoor device of the plurality of indoor devices, and controls the indoor device including the malfunctioning sensor based on the calculated temperature value of the malfunctioning sensor, wherein an opening degree of the indoor expansion valve of the another indoor device including the normally functioning sensor is equal or similar to an opening degree of the indoor expansion valve of the indoor device including the malfunctioning sensor, determines whether the air conditioner operates by a direct control operation of the outdoor device when the air conditioner does not operate by the normal superheat control, wherein the direct control operation of the outdoor device is to control regardless of the value of the normally functioning sensor, wherein in case of the direct control operation of the outdoor device, the controller controls the indoor device regardless of the value of the normally functioning sensor.

8. The air conditioner of claim 7, wherein the temperature value of the malfunctioning sensor is calculated during an oil return emergency control or a defrosting emergency control, which are not direct control operations of an outdoor unit.

9. The air conditioner of claim 7, wherein the malfunctioning sensor is an inlet pipe temperature sensor of the indoor device or an outlet pipe temperature sensor of the indoor device.

10. The air conditioner of claim 7, wherein the calculating of the temperature value of the malfunctioning sensor is not performed until after the direct control operation has been determined to be not occurring.

11. The air conditioner of claim 7, wherein the calculating of the calculating of the temperature value of the malfunctioning sensor is not performed until after the start control operation has been determined to have occurred, but before an occurrence of the direct control operation has been determined.

* * * * *